United States Patent Office 3,785,919
Patented Jan. 15, 1974

3,785,919
COMPOSITE FILAMENT WITH ELASTOMERIC CORE AND MICROAPERTURED POLYPROPYLENE FOAM SHEATH AND PROCESS THEREFOR
Robert Winfield Hickman, Waynesboro, Va., assignor to E. I. du Pont de Nemours and Company, Wilmington, Del.
Continuation-in-part of abandoned application Ser. No. 94,821, Dec. 3, 1970. This application Nov. 9, 1971, Ser. No. 196,947
Int. Cl. B32b 5/18, 31/14; D02g 3/22
U.S. Cl. 161—175                                         7 Claims

ABSTRACT OF THE DISCLOSURE

A microapertured foam of a polymeric material, such as polypropylene. The foam can be applied to an elastomeric core yarn, such as a spandex core, to form a sheath around the core. The foam sheath protects the core yarn from degradation, while improving dyeability, elongation-to-break, and other properties of the sheath-core composite filament over art-known composite filaments.

CROSS REFERENCE TO RELATED APPLICATION

This application is a continuation-in-part of application Ser. No. 94,821, filed Dec. 3, 1970 and now abandoned.

BACKGROUND OF THE INVENTION

(1) Field of the invention

This invention is directed to a microapertured foam of a synthetic organic polymer, and to composite textile filaments comprising a continuous elastomeric core yarn surrounded by a sheath of the foam.

(2) Description of the prior art

Composite textile filaments composed of continuous sheaths of closed-cell, polymeric foam covering elastomeric core yarns are disclosed in U.S. Pat. 3,507,741. The sheath is under compression and the core is under tension when the composite filament is in unstressed condition, thus providing efficient use of the retractive power of the core. The sheath protects the core from oxidizing and discoloring agents and hides any core discoloration which may occur. In fabrics, the composite filament contributes improved cover, opacity and bulk at low weight. The filament is made by elongating the core yarn, coating it with a foamable composition, allowing the foamable composition to expand to form a closed-cell foam, then allowing the core to retract.

The filaments of U.S. Pat. 3,507,741 have a foam sheath that is of the closed-cell foam type, and when these filaments are subjected to a tensile load, the sheath breaks long before the core breaks. Thus, the filaments are unable to utilize the elastic function of the elastomeric core yarn to its full advantage. In contrast, the microapertured foam sheath used in the composite filaments of this invention breaks at about the same time the core yarn breaks, thus providing an advantage over the closed-cell art composite filaments. The filaments of the present invention also have greater elongation to break and higher tenacity at break than these prior art composite filaments.

In addition, the composite filaments of this invention can be produced at a much higher rate than the closed-cell art composite filaments, primarily because less viscous solutions are employed during preparation of the composites.

THE INVENTION

The foam of this invention is a novel structure in that the walls of most (a preponderance) of the cells making up the polymeric foam have microapertures, or small holes, in them.

The novel composite filaments of this invention comprise a core of a continuous elastomeric yarn surrounded by the novel foam in the form of a sheath. One surprising effect of the novel microapertured foam sheath, when used around the elastomeric core yarn, is to provide the resulting composite filament with the property referred to herein as "single break." "Single break" means that when a sufficient tensile load is applied to the filament, the sheath and the core both break almost simultaneously. Another surprising effect is that the presence of the microapertures does not lessen to any appreciable extent the ability of the sheath to protect the core yarn from oxidation and discoloration.

The process of this invention comprises passing a tensioned, elongated elastomeric yarn through a zone in which a foamable material is applied around the strand. The solids concentration in the foamable material (e.g., polypropylene in methylene chloride) and the solution spinning temperature are selected within a critical range so as to result in a foam structure having microapertures. The coating is allowed to expand to form the foam structure and then set prior to allowing the core to retract.

DETAILED DESCRIPTION OF THE INVENTION

The microapertured, polymeric foam

Figure 1:
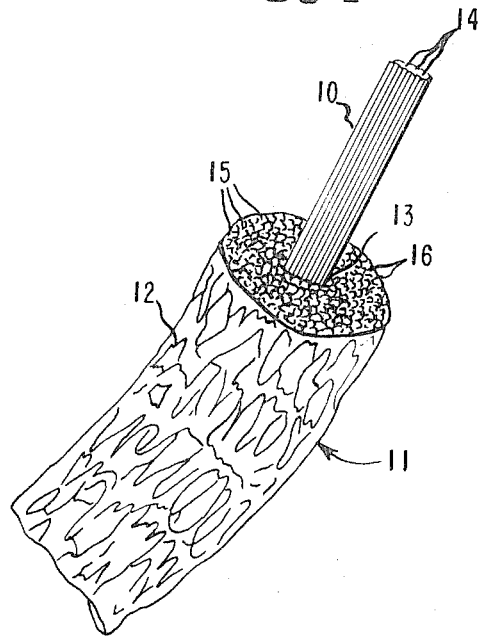
FIG. 1 is an enlarged, schematic, perspective representation of a cut end of a composite elongate textile filament according to this invention wherein part of the sheath at the cut end is removed to show the core yarn and microapertured foam cell walls.

The microapertured, polymeric foam of this invention has a structure distinct from that of closed-cell foams, exemplified in the aforementioned U.S. Pat. 3,507,741, and from that of open-cell foams which are characterized by the absence of one or more cell walls. The distinct feature is that the microapertured foam of the present invention contains a predominance of cells whose walls contain small holes called "microapertures."

The cells generally are randomly located in the cell walls throughout the foam, and the microapertures have diameters between about 1 and about 50 microns (averaging about 12 microns in diameter). The average microaperture area per cell is between about 60 and 100 square microns. Preferably the total area of the microapertures of any given cell wall will be less than aabout 50% of the cell wall area of such given cell, and less than about 10% of the average cell wall area. For optimum enhancement of physical properties, a predominant number (at least 50%) of the cells should be interconnected by microapertures. Preferably, two or more cell walls per cell contain the microapertures.

Generally, the cells have an irregular polyhedral shape, and the cell walls have, on the average, an area of about 1000 square microns per cell wall. Compressibility, softness, and extensibility of foamed structures generally increase with decreasing cell-wall thicknesses, and thicknesses less than about 2 microns are preferred. It is preferred that the foams be free from external skins of dense polymer other than that contributed by the exposed walls of foam-cells; i.e., the foam should be homogeneous throughout its volume.

Cell-size and cell-wall thickness are not critical in the foams of this invention. As is well known, however, opacity and whiteness of a polymeric foam increase with decreasing cell-size, and it is therefore preferred that the foam have cells with maximum transverse dimensions less than about 1000 microns. More preferably cell diameters range between about 25–300 microns and most preferably between about 50–100 microns or less.

The density of the foamed polymeric material is not critical, but ordinarily it should be no more than one-half that of its original solid polymer. Foam density is usually selected on the basis of the nature of the properties desired of the filament of this invention.

The microapertured structure is not visible to the unaided human eye. However, when a group of micro-apertured cells is viewed (as described hereinafter) under a medium power microscope, microapertures are seen in the plane of focus. Since this observation is difficult and time consuming, particularly when used to measure extent of microapertured structure, it is generally more convenient to use a secondary test (namely, the ethanol permeation test for porosity index, described hereinafter) to not only confirm the existence of microapertures in cell walls and their interconnection, but also to indicate whether the microapertures are present in sufficient number and size to provide the advantages of the composite filaments of this invention. By using the porosity index (P.I.), it has been determined that foams produced according to U.S. 3,507,741 generally have a P.I. of about 2 and open cell foams have a P.I. of more than 30. The porosity index of the microapertures foam of this invention ranges between about 2.5 and about 24.

Polymers which can form foams of this invention (and thus sheaths for the filaments of this invention) are synthetic organic polymers which include: polyhydrocarbons such as polyethylene, polypropylene, or polystyrene; polyethers such as polyformaldehyde; vinyl polymers such as polyvinylidene fluoride or polyvinyl chloride; polyamides such as polyhexamethylene adipamide, polycaprolactam, or polymetaphenylene isophthalamide; polyurethanes, both aliphatic and aromatic, such as the polymer from ethylene bichloroformate and ethylene diamine; polyesters such as polyhydroxypivalic acid or polyethylene terephthalate; copolymers such as polyethylene terephthalate-isophthalate; polynitriles such as polyacrylonitrile or polyvinylidene cyanide; and polyacrylates such as polymethylmethacrylate. The particular polymer and the properties thereof may be chosen according to the desired end use for the filament. Preferably, the polymer is flexible and thermoplastic.

The composite filaments

Referring now to FIG. 1, a continuous elastomeric yarn 10, comprised of a series of strands 14 is continuously and coextensively covered with foamed polymeric sheath 12 of which the foam-cells 16 are predominantly of the microapertured variety. In FIG. 1, the foam-sheath 12 is shown cut back so as to readily reveal the elastomeric core 10. The composite filament, generally indicated by the numeral 11, has a balance of forces along its fiber-axis such that core 10 is under tension and sheath 12 is under longitudinal compression. A simple test to show this balance of forces is set forth in said U.S. 3,507,741, at column 2, lines 44–60. FIG. 1 is an enlarged view of filament 11 drawn to reveal details without regard to relative dimensions. The relative dimensions of sheath 12, cells 16, core 10, and strands 14 are therefore not necessarily representative of any specific product of this invention.

In order to accommodate the core 10, a central channel 13 must exist throughout the length of sheath 12. Moreover, penetration of the foamed material into the interstices between strands 14 is also possible. Channel 13 is usually somewhat larger than core 10, as indicated in FIG. 1. This situation does not destroy the balance of forces which keeps core 10 under tension. Apparently, frictional forces at random contacts between core 10 and sheath 12 are sufficient to prevent retraction of core 10 to its untensioned state.

Figure 2:
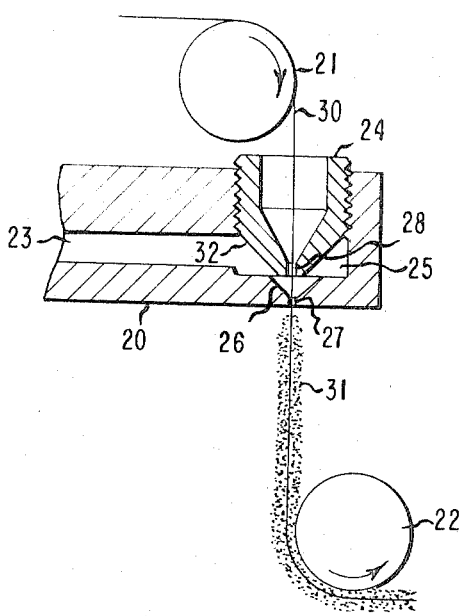
FIG. 2 is a schematic elevational view, partially in cross-section, of an apparatus suitable for applying the foam sheath to the core under the conditions necessary to produce the product of this invention.
Figure 3:
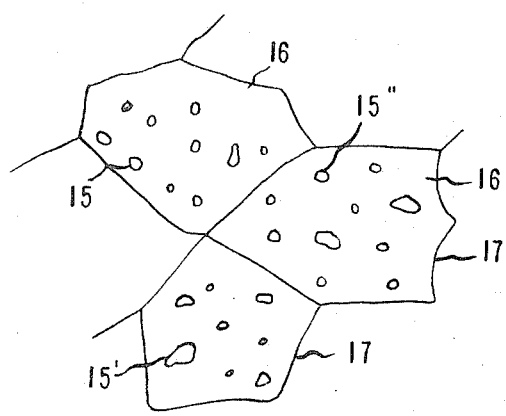
FIG. 3 is a highly magnified schematic representation of microapertured walls of a group of cells from within a typical foam of this invention.

The micro-apertures of the cells are illustrated by the dots 15 placed on the walls of cells 16 in FIG. 1. This microstructure is better seen in the larger scale schematic representation of FIG. 3, which shows a group of cell walls having the microapertured structure. Individual cell walls, such as those shown in the plane of FIG. 2 are surrounded by out of plane walls 17. Close observation of those cell walls which fall in the focal plane of the microscope reveal a microapertured structure illustrated by the irregular holes 15, 15', 15" in the cell walls. An actual piece of microapertured foam of this invention will have a predominant number of cells with walls as illustrated in this figure. Some cell walls, however, may have only one or two microapertures; some may have none.

The radial thickness of the foam sheath on the filaments is limited by the end utility chosen for the particular filament produced. It must be such that the core is continuously covered. The minimum thickness is determined by the desired level of protection of the core from attack by bleach, fumes, etc. The maximum protective thickness of the foam sheath is limited by tolerable levels of bulk and elasticity for specific uses.

The elastomeric yarn used as the core of the filaments of this invention (identified by numeral 10 in FIG. 1) is defined as being comprised of at least one filament, yarn or other strand of a material that may be elongated in excess of 100% without breaking and that retracts almost completely in length after release from elongation up to nearly the breaking elongation. Among suitable elastomeric core materials are rubber (natural or synthetic) and segmented polyurethanes. Preferred elastomeric strands include those spandex strands formed of a segmented polyurethane described in several patents among which are U.S. Pats. 2,929,801, 2,929,802, 2,929,803, 2,929,804, 2,953,839, 2,957,852, 2,999,839, 3,040,003, and 3,071,557. As described in the aforementioned patents the segmented polyurethane elastomers are comprised of amorphous segments derived from polymers having a melting point below about 50° C. and a molecular weight above about 600, and contain from about 5% to 40% of crystalline segments derived from a polymer having a melting point above about 200° C. in the fiber-forming molecular weight range. Most of such polyurethanes, when in filament, yarn or strand form, have elongations greater than 150%, tensile recovery of over 90%, and a stress decay of less than 20%, as defined in U.S. Pat. 2,957,852. The spandex cores used in the examples herein are made of Lycra®. Lycra® is the registered trademark of E. I. du Pont de Nemours and Company for spandex yarn.

Process for producing the composite filament

The process for producing the foam and the composite textile filaments of this invention comprises feeding an elastomeric yarn through a zone in which it is held elongated under tension and, while it is still in said zone, applying thereto a continuous coating of a microapertured foam-forming composition, allowing said composition to expand to a microaperture foam continuously covering said elongated moving yarn, and thereafter passing the resulting composite filament from said zone of elongation to a zone where tension on the composite filament is released, thereby causing the core of said filament to partially retract and the sheath to be compressed longitudinally of the filament-axis until a balance of forces is established which keeps said core partially elongated and tensioned within its covering of microapertured foam. The preferred apptratus for this process is shown in FIG. 2. The elastomeric yarn 30 is withdrawn by feed roll 21 from a source of supply not shown and introduced to the coating device 20. Yarn 30 is pulled by pull roll 22 whose speed is adjusted to provide a preselected degree of elongation between rolls 21 and 22. Preferably this elongation is between about 100 and 700% of the untensioned length. While yarn 30 is thus elongated between rolls 21 and 22 it enters apparatus 20 through orifice 28 in threaded gland 24. Simultaneously, a solution of polymeric materials capable of forming a microapertured foam is injected under pressure through channel 23 and into chamber 25 surrounding a portion of yarn 30 as it moves from orifice 28 to orifice 27. Upon exiting from orifice 27 the coating on yarn 30 foams and creates a continuous foam sheath 31 about yarn 30. The separation between orifice 27 and roll 22 is adjusted so that the foam sheath 31 becomes sufficiently set that when the resulting composite filament passes beyond roll 22 and the tension on it is relaxed, the sheath 31 is placed under longitudinal compression and the core 30 is placed under residual tension. This is possible because appreciable interacting forces exit between core yarn 30 and sheath 31. The extent to which core yarn 30 is held under tension depends upon the relative sizes and stress-strain properties of yarn 30 and foam sheath 31. Although the threaded gland design of FIG. 2 is satisfactory, many other equivalent mechanical devices to provide the application of foamable material around a running strand are conceivable.

Figure 4:
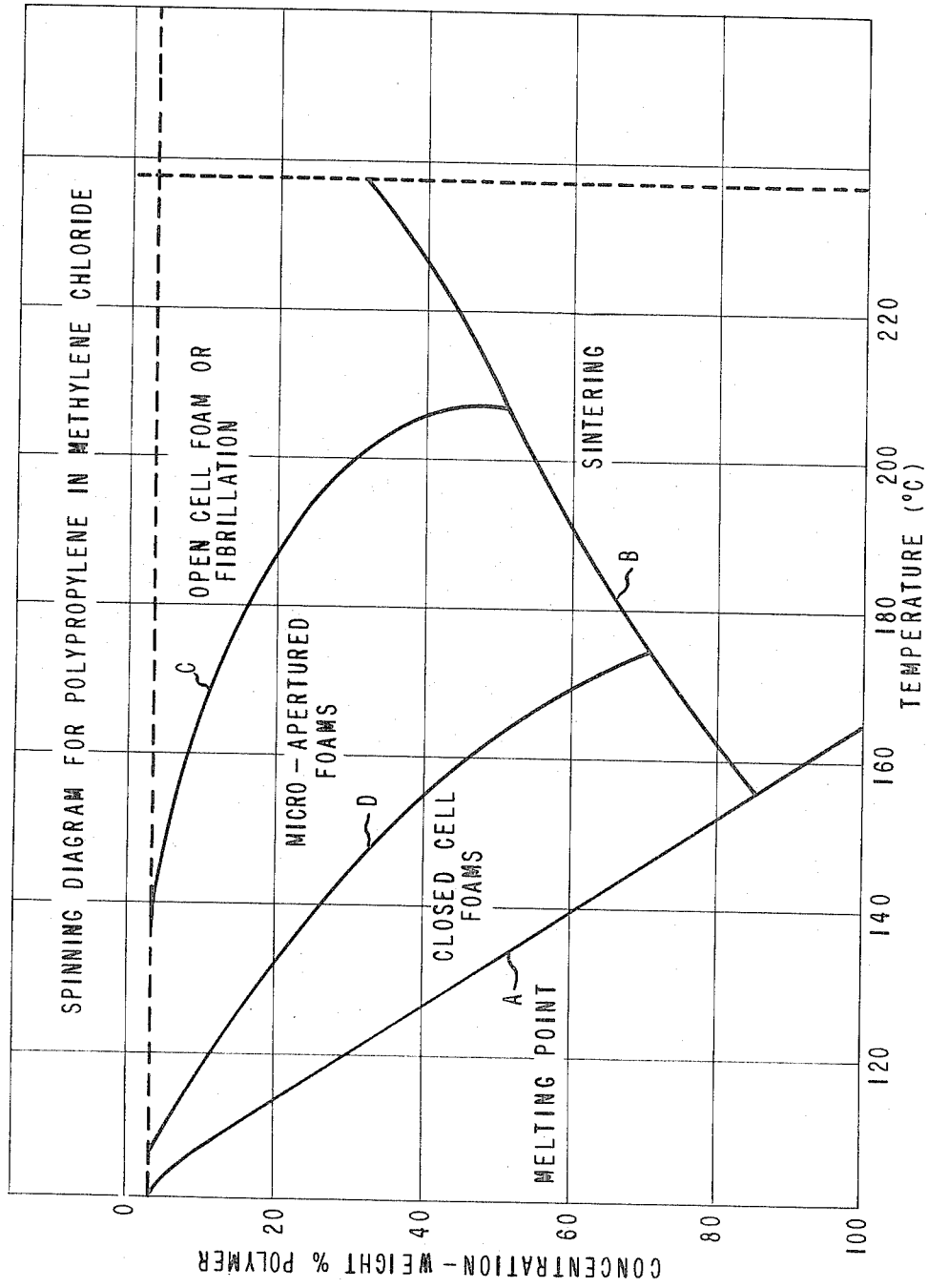
FIG. 4 is a generalized spinning diagram for the spinning, under nitrogen pressure, of polypropylene and methylene chloride. The diagram depicts an area which is suitable for practicing the process of this invention.

It has been discovered that the foam forming composition and processing conditions may be selected so as to provide a continuous, uniform sheath of the desired thickness and also to simultaneously provide a microapertured cell wall structure. The permissible concentration ranges of the components of the solution which forms the microapertured foam vary in accordance with the particular polymer, solvent, and processing conditions to be used. The proper solvent, temperature, and concentration of polymer for a given set of materials and processing conditions may be determined empirically so as to enable the drawing of a spinning diagram as exemplified by FIG. 4, which is a spinning diagram for a polypropylene in methylene chloride system in a nitrogen pressurized atmosphere. This diagram records solution temperature at time of application to the core increasing from 100° C. on the left to 240° C. on the right on the abscissa and concentration of polymer in solution decreasing from 100% to 0 upward along the ordinate. Line A on this diagram is the melting point line; Curve B, the sintering line (see U.S. Pat. 3,227,784, colums 7, 8 and 9); and Curve C represents a general area along which extrusion of the spinning mixture begins to result in open-cell foams or in fibrillation. Curve D is selected so that the area between Curve D and Curve C encloses the area representing conditions of temperature and solution concentration acceptable for producing the material of this invention. Thus, the polymer concentration of the microapertured foam forming composition and temperature thereof may be selected according to the applicable spinning diagram. In a polypropylene-methylene chloride system these variables are preferably selected so as to produce a microapertured foam sheath having a porosity index greater than 2.5 and less than 24. Conditions above and to the right of Curve C produce open cell foams or fibrillated materials which fail to protect the elastomeric core yarn from atmospheric fumes, bleaches and so forth. Certain conditions below and to the left of Curve D are appropriate for producing the foams disclosed in U.S. 3,507,741. Spinning diagrams similar to FIG. 4 can be routinely determined for systems other than polypropylene in methylene chloride by empirically varying temperature and colution concentration over sufficient ranges to establish characteristic Curves C and D comparable to those of FIG. 4. Slightly changed curves are obtained for atmospheres other than nitrogen if used in the preparation and spinning of a particular solvent system.

Utility and advantages of the composite filament

The filaments of this invention provide good protection of the elastomeric core against degradative agents while providing improved dyeability, elongation-to-break, tenacity and fabric wear life over filaments of the same composition that do not have microapertures in the non-elastomeric foam sheath. In addition, the filaments have the "single break" feature which constitutes an advance over the filaments of U.S. 3,507,741. The enhancement of some of the above-described mechanical properties, while maintaining degradation protection, is demonstrated in FIG. 5 for filaments having spandex cores and polypropylene sheaths. In this figure the independent variable, plotted on the X axis, is the measured value of porosity index (determination of this value appears below). The range is from that for the foam structure essentially without any microapertures at the origin of the X axis to the foam structure of an open-cell foam at the right side of the X axis. Two variables are plotted along the Y axis. Curve "$E_B$" is a plot of the tensile elongation at which the sheath breaks. The other property which is plotted in FIG. 5 as curve "$\Delta b$" is an index of core protection. Descriptions of tests for porosity index and core protection are given below.

Figure 5:
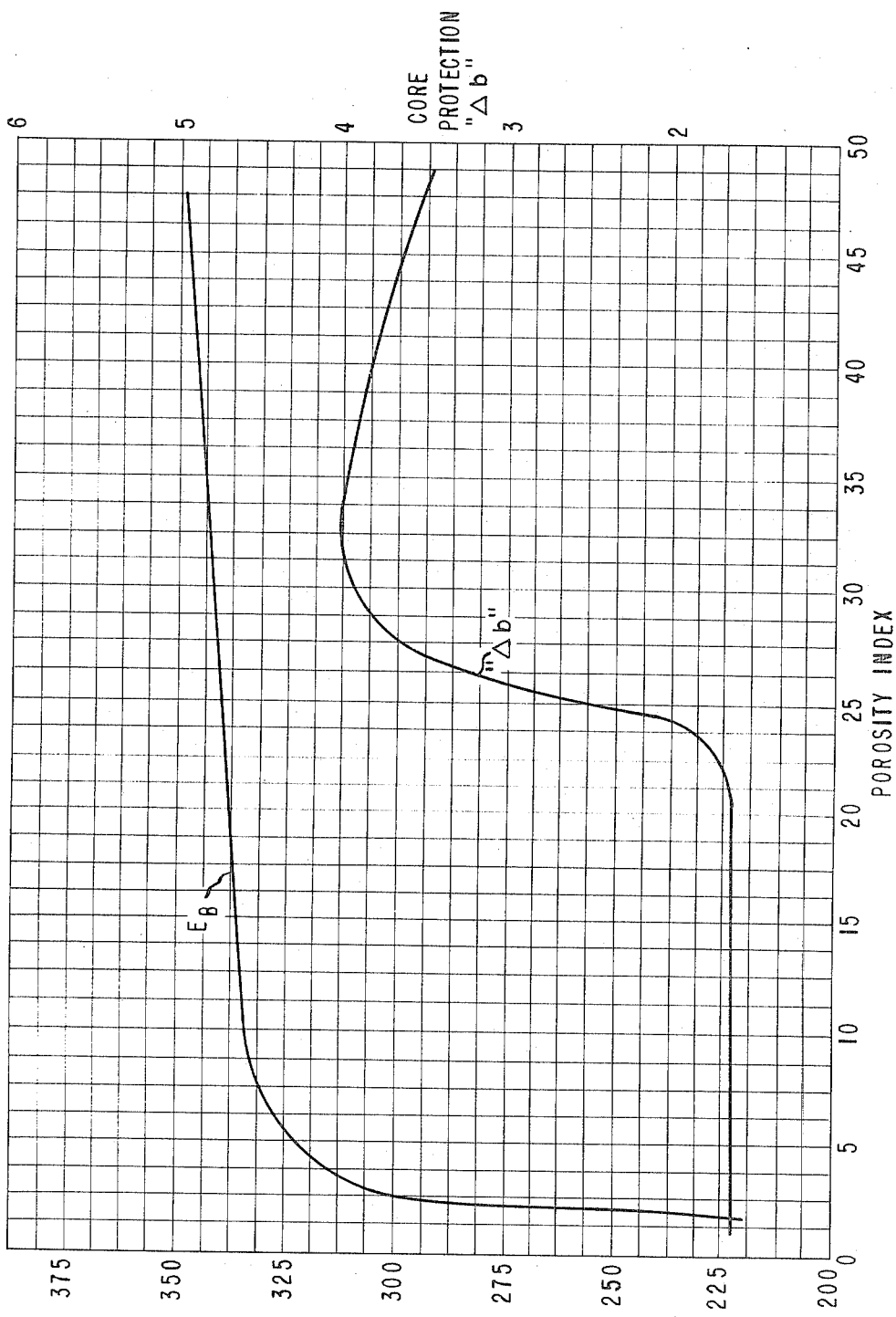
FIG. 5 is a graphical representation of two important properties exhibited by the filaments of this invention, namely elongation required to break the sheath, and core protection, both as a function of a sheath porosity index.

FIG. 5 graphically illustrates that composite filaments of the present invention represent a significant improvement over those disclosed in the prior art. Elastomeric core yarns with sheaths of foam prepared as disclosed in U.S. Pat. 3,507,741 have low $\Delta b$ and relatively low $E_B$, and therefore although they exhibit good protection of the core they also exhibit lower breaking elongation. Sheaths of open-cell structure have a high $\Delta b$ and high $E_B$, and therefore exhibit poorer core protection but have high breaking elongation. Elastomeric core yarns having microapertured foam sheaths of substantially the same cover provide both good core protection and high breaking elongation.

MEASUREMENTS AND TESTS

Microaperture measurement (1) Microscopic examination: Thin cross or longitudinal sections of foam sheath are examined using either a classical 200–1000× microscope or by means of electron microscope stereoscan. Examinations of this type were used to establish the existence of microapertures and to estimate the size of apertures and their extent.

(2) Porosity Index - Ethanol Permeation Test: The "porosity index" of a foam of this invention, or of a foam employed as a sheath of a yarn of a composite filament of this invention is determined by measuring the buoyancy change of a sample of the foam or yarn, as the case may be, as a function of immersion time in ethanol, a penetrating medium. The porosity index is the slope ($\times 10^4$) of the plot of apparent yarn density (gms./cc.) vs. immersion time (minutes).

For the purposes of this invention, the porosity index is determined by the ethanol permeation test as described in detail below with respect to a yarn made of filaments of this invention. A Westphal balance was used to determine the weight of an aluminum cylinder while immersed in ethanol. A weighed sample (~0.2000 gm.) of the yarn was then wound uniformly around the cylinder with a 4.5 g. load to reduce mechanical crimp. The cylinder plus the yarn sample were then immersed in the ethanol bath in the Westphal balance. The immersion time was noted. The change in weight of the cylinder plus sample was observed as a function of time (minutes) at intervals for a period of up to 100 minutes. Care was taken to dislodge any trapped air bubbles before each weighing. The apparent yarn density for each weighing was determined by dividing the initial yarn weight by the yarn volume. The yarn volume was found by subtracting the weight of the cylinder plus yarn in ethanol from the sum of the weight of the cylinder in ethanol and the initial weight of the yarn sample.

The slope of the apparent yarn density vs. time (minutes) plot was then found using the portion of the plot from about 10 to 100 minutes immersion time. The value of the slope $\times 10^4$ is the porosity index of the filament.

Yarn properties (1) Core Protection Test: The protection of the elastomeric core that is provided by the foam sheath is determined by exposing samples of a yarn of the composite filaments to hypochlorite bleach solution and simulated atmospheric fumes and measuring the degree of yellowness, referred to as the "b" value. The "b" value is determined from colorimetric data obtained by analyzing samples of the yarn in aggregates which are about 3 sq. in. (7.6 cm.). The reflectance ratios of the samples in the green and blue filter settings of a colorimeter are measured, using a Model IV Color Master Differential Colorimeter, manufactured by Manufacturing Engineering and Equipment Corporation, Hatboro, Pa., and calibrated against the manufacturer's standard reference plates and the National Bureau of Standards' certified reflectance plates. Three readings are taken on each of the samples, one of the measurements for the samples being made with the sample rotated 90° from the position from the first reading. The "b" values are then calculated from the average of three readings, using the following formula:

$$"b" = 42.34(G^{1/3} - B^{1/3})$$

where G represents the reflectance ratio with the green filter and B represents the reflectance ratio with the blue filter.

The test for hypochlorite discoloration is performed by wrapping the yarn on a block of polytetrafluoroethylene, determining the initial "b" value, and then immersing it for two 60 minute periods in an aqueous solution of 0.05% sodium hypochlorite and 0.2% Tide at 70° C. The samples are rinsed with cold water, dried thoroughly, and again measured for color. The change in yellowness is expressed as "$\Delta b$," where "$\Delta b$" is the difference between the initial "b" value and the final "b" value.

The test for simulated atmospheric discoloration is performed by wrapping samples of the yarn on a block of polytetrafluoroethylene and exposing them to a synthetic atmosphere containing air, nitrogen dioxide, sulfur dioxide, and 2-pentene for eight hours, during which exposure the samples are irradiated by a combination of ultraviolet and visible light. The samples are measured for color, both before and after exposure. The difference is expressed as "$\Delta b$."

An average "$\Delta b$" value for the hypochlorite and atmospheric exposures was calculated for each sample. An average "$\Delta b$" value greater than three was considered unacceptable for these test conditions.

(2) Mechanical properties—tenacity ($T_B$) and elongation at break ($E_B$): Yarn specimens were selected, boiled off for 30 minutes, and tested in an atmosphere of 65% RH, 70° F. (21.1° C.). Strength tests were made using a well known Instron® tensile tester. Specimens were mounted with 20 gm. initial load, 5.1 cm. initial clamp separation and strained at a rate of 500% per minute. The stress-strain graph was recorded in the usual manner for an Instron® tester. Elongation-to-break ($E_B$) was taken from the graph at the point where stress suddenly dropped off. The value of force on the yarn at this same break point was taken as tenacity at break ($T_B$).

(3) Cover: Yarn percentage cover is determined by first weighing a convenient length of a yarn of the composite filaments on an analytical balance. The sheath of this specimen is then split along the entire length and the core removed. This specimen of sheath is now weighed and percent cover computed from the ratio of sheath weight to corresponding composite yarn weight.

(4) Denier: Yarn denier is determined by conventional techniques of weighing a known length of sample. In this case the length is measured when the yarn is under a static tensile load of 20 grams.

EXAMPLES

The following examples illustrate the products and processes of this invention.

Example I

Two samples of yarn within the scope of this invention were made as follows by coating a core of 1680 denier Lycra®.

A solution of 36% solids concentration was made by mixing linear polypropylene (having a melt-flow index (MFI) of 10.8) in $CH_2Cl_2$ with 0.5% (based on polymer weight) silica aerogel in a closed container under nitrogen pressure at a temperature of 180° C. The container was initially pressurized to 200 p.s.i.g. ($1.41 \times 10^5$ kg./m.²) of nitrogen at about room temperature, and then the temperature was raised to 180° C. This solution was then cooled to 170° C. and pumped to a spinning apparatus such as shown in FIG. 2 at a line temperature of 150° C. and spun with a nitrogen pressure of 600 p.s.i.g. ($4.22 \times 10^5$ kg./m.²) in channel 23. The solution was spun into chamber 25 to surround the Lycra® core yarn that was simultaneously running through orifice 28. The first sample, (a) was made with an input core yarn speed of 44 y.p.m. and the second, (b), of 66 y.p.m. (60.4 m./min.). Output core yarn speeds were selected to provide 5× stretch of the core in each case. The spinneret was selected with a 16 mil (0.41 mm.) upper orifice at a 20 mil (0.51 mm.) lower orifice. The yarns so produced were tested as described above with the following results:

| Sample: | Percent cover | Denier | $E_B$ (percent) | $T_B$ (grams) |
|---|---|---|---|---|
| (a) | 53 | 1,875 | 325 | 1,251 |
| (b) | 45 | 1,703 | 333 | 1,077 |

Specimens of the sheaths of the samples were examined under a microscope. Samples (a) and (b) showed microapertured cell walls within the scope of the foam of this invention. All samples showed a high level of core protection after exposure to bleaches and simulated atmospheric fumes.

Examples II–XIII

A series of samples of composite foam-covered Lycra® yarn was made under conditions selected to result in composite filaments of this invention, as well as some outside the scope of this invention. All started with a 1680 denier Lycra® core yarn coated while under 5× stretch with input speeds as noted in the following table. Solutions for coating the core yarn with the foamable composition were prepared with percent solids as noted for each sample. Solutions were mixed in an atmosphere of nitrogen in a closed container under pressure as described in Example I and extruded with the mix vessel under 600 p.s.i.g. ($4.22 \times 10^5$ kg./m.²) nitrogen pressure. Solution supply line pressure ranged from 600 to about 1000 p.s.i.g. ($4.22 \times 10^5$ to about $7.03 \times 10^5$ kg./m.²). Solution was held at 170° C. in mix vessel and 150° C. in the supply line to the spinneret. Each solution comprised, in addition to the 10.8 MFI linear polypropylene, about 0.5% based on polymer weight of a silica aerogel in methylene chloride solvent.

The percent solids, speed and spinneret conditions were selected to provide samples of yarn with foam sheaths including the type covered in U.S. 3,507,741 (Examples XII–XIII), the microapertured foam sheaths of the present invention (Examples V–XI), and open-cell sheath structures (Examples II–IV).

Results are shown in the following table:

TABLE I

| Example | Solids, percent | Lycra® input, m./min. | Orifice sizes, mm. | Percent cover | Denier | $E_B$ (percent) | $T_B$, gms. | Core protection average, $\Delta b$ | Porosity index |
|---|---|---|---|---|---|---|---|---|---|
| II | 10 | 21.9 | 0.51/0.64 | 48 | 2,000 | 356 | 865 | 3.5 | 47 |
| III | 13 | 40.2 | 0.51/0.64 | 32 | 1,517 | 341 | 909 | 4.2 | 29 |
| IV | 13 | 21.9 | 0.51/0.64 | 47 | 1,860 | 337 | 860 | 3.8 | 31 |
| V [1] | 15 | 40.2 | 0.51/0.64 | 45 | 15.0 | 311 | 835 | 1.8 | 24 |
| VI [1] | 25 | 40.2 | 0.51/0.64 | 53 | 1,893 | 328 | 987 | 1.7 | 19 |
| VII [1] | 30 | 40.2 | 0.51/0.64 | 57 | 2,080 | 337 | 952 | 1.5 | 10 |
| VIII [1] | 32 | 40.2 | 0.51/0.64 | 60 | 2,077 | 334 | 1,085 | 2 | 7.5 |
| IX [1] | 36 | 40.2 | 0.51/0.64 | 61 | 2,255 | 318 | 1,303 | 2 | 5 |
| X [1] | 40 | 40.2 | 0.51/0.64 | 60 | 2,292 | 326 | 1,317 | 2 | 4.2 |
| XI [1] | 44 | 40.2 | 0.51/0.64 | 60 | 2,250 | 323 | 1,080 | 2 | 3.8 |
| XII | 48 | 40.2 | 0.51/0.64 | 62 | 2,058 | 225 | 820 | 2 | 1.7 |
| XIII | 48 | 40.2 | 0.46/0.56 | 51 | 2,132 | 235 | 620 | 2.5 | 2.0 |

[1] Examples according to present invention.

These data illustrate the novel range of microapertured sheath structure evidenced by a range in porosity index from greater than about 2.5 to about 24 with attendant core protection average "$\Delta b$" less than 2.0 and at the same time elongation at break, $E_B$, above about 300% and $T_B$ above about 830 grams. Preferably, the porosity index range for the filaments of the invention is from about 3.8 to about 24.

Example XIV

To illustrate the diversity of elastomeric core yarns applicable to this invention, a supply of slit 36 gage natural rubber was substituted for the Lycra® core yarn. The process was substantially as noted in the previous examples with the percent solids, here, made 36, spinneret orifices of 30 and 35 mils respectively, yarn input speed of 44 y.p.m. (40.2 m./min.) and a core stretch in coating of 4.5×. The composite filament thus produced was found to have a cover of 45%, elongation to break of 286% and tensile strength of 673 grams. The sheath was observed to contain microapertures as defined above.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A composite textile filament comprising a core of at least one continuous elastomeric yarn and a continuous sheath of a polypropylene foam completely covering the core wherein a preponderance of the cells of the foam have microapertures in the walls of the cell, said core being under tension and said sheath under compression along the fiber-axis of said composite filament when in unstressed condition.

2. The textile filament of claim 1 in which the microapertures have diameters between about 1 to about 50 microns and the average area of the microapertures per cell being from about 60 to 100 square microns.

3. The textile filament of claim 2 wherein the microapertures comprise less than 10% of the average cell wall area.

4. The textile filament of claim 3 wherein said sheath has a porosity index greater than 2.5 and less than about 24.

5. The textile filament of claim 4 wherein said elastomeric yarn is a spandex yarn.

6. A process for producing a composite textile filament having an elastomeric core and a continuous sheath of microapertured, polypropylene foam comprising feeding an elastomeric yarn through a zone in which it is held elongated under tension; and, while it is still in said zone, applying thereto a continuous coating of a polypropylene foam-forming composition, said foam-forming composition being a solution of polypropylene in methylene chloride wherein the concentration of polypropylene in said solution and the temperature of said solution when applied to said elastomeric yarn are within the area bounded by lines B, C, and D of FIG. 4; allowing said composition to expand to a microapertured foam continuously covering said elongated moving yarn; and thereafter passing the resulting composite filament from said zone of elongation to a zone where tension on the composite filament is released, thereby causing the core of said filament to partially retract and the sheath to be compressed longitudinally of the filament-axis until a balance of forces is established which keeps said core partially elongated and tensioned within its covering of microapertured foam.

7. A process according to claim 6 wherein said elastomeric yarn is a spandex filament and is elongated between about 100% and 700% of its unstressed length at the time it is coated with said solution.

References Cited

UNITED STATES PATENTS

| | | | |
|---|---|---|---|
| 3,507,741 | 4/1970 | Aleixo | 161—175 |
| 3,378,507 | 4/1968 | Sargent | 161—159 |
| 3,551,280 | 12/1970 | Kippan | 264—47 X |
| 3,091,019 | 5/1963 | Wetterau | 156—78 UX |
| 3,210,446 | 10/1965 | Yamakawa et al. | 156—79 |
| 3,227,784 | 1/1966 | Blades et al. | 260—2.5 E |
| 3,227,664 | 1/1966 | Blades et al. | 161—178 |

GEORGE F. LESMES, Primary Examiner

L. T. KENDELL, Assistant Examiner

U.S. Cl. X.R.

156—78, 79; 161—176, 178; 260—2.5 E, 2.5 R; 264—45, 47